United States Patent
Frei et al.

[15] 3,675,741
[45] July 11, 1972

[54] BICYCLE DISC BRAKE

[72] Inventors: Karl Frei, Horseheads; Edwin Elliott Hood, Elmira, both of N.Y.

[73] Assignee: The Bendix Corporation

[22] Filed: March 29, 1971

[21] Appl. No.: 129,090

[52] U.S. Cl.............................................188/26, 188/72.8
[51] Int. Cl................................................................B62l 5/06
[58] Field of Search..................................188/24–27, 72.7, 188/72.8

[56] References Cited

UNITED STATES PATENTS 2,612,968  10/1952  Hood........................................188/26
3,052,326  9/1962  Baisch....................................188/72.8

Primary Examiner—Duane A. Reger
Attorney—William S. Thompson and Plante, Hartz, Smith & Thompson

[57] ABSTRACT

A disc brake for bicycles having a rotor mounted externally on a bicycle wheel hub and a brake housing mounted in a bracket affixed to the wheel axle wherein the brake housing has limited slidable movement in the support bracket to permit alignment with the rotor but is restrained from rotating about its own axis by a complementary opening and housing shape. The brake includes a mechanically manipulated threaded actuator to apply brake motion with a high mechanical advantage.

7 Claims, 4 Drawing Figures

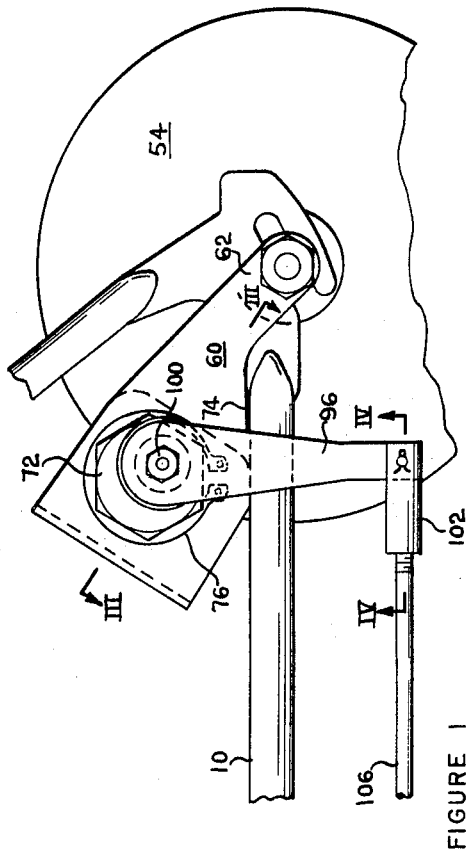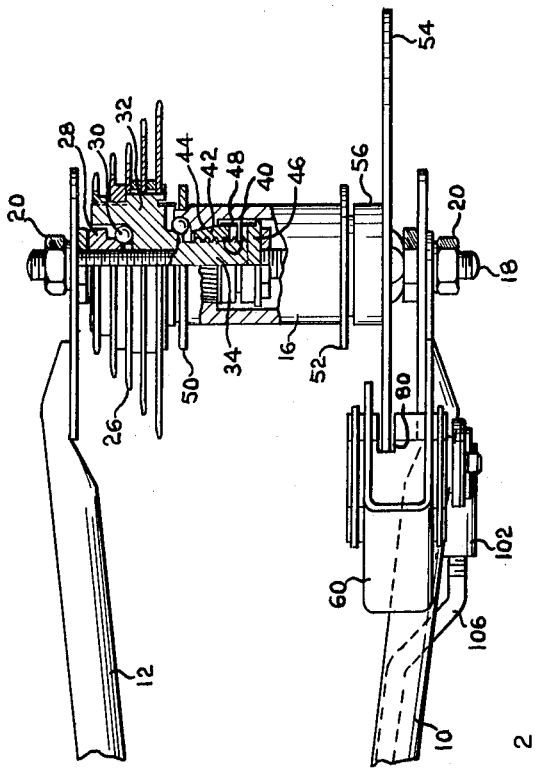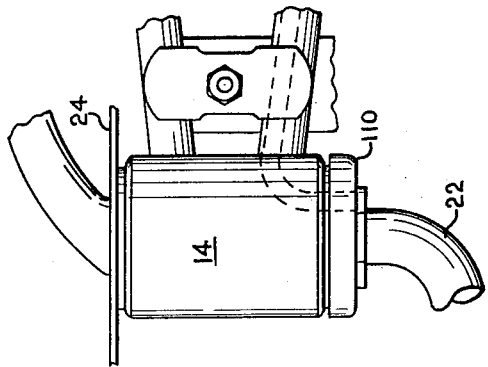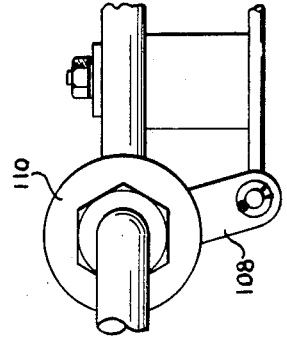
FIGURE 1
FIGURE 2
KARL FREI
EDWIN ELLIOTT HOOD
INVENTORS
BY *W. S. Thompson*

KARL FREI
EDWIN ELLIOTT HOOD
*INVENTORS*

BICYCLE DISC BRAKE

BACKGROUND OF THE INVENTION

The more well known forms of bicycle brakes are the hub enclosed coaster brake and wheel rim or tire gripping caliper brakes. Generally the coaster brake is actuated by the bicycle drive chain on reverse pedaling and offers a strong positive brake, but with a tendency to being oversensitive or grabby on initial actuation and complex due to the limited space in which it must be located. Caliper brakes are usually of the hand squeeze grip actuated type through cables and are less reliable due to cable stretch, exposure to the elements and the like. While the disc brake is a well known brake type, it has not been successfully applied to bicycles to the point of achieving wide acceptance in spite of the fact that is has a very good braking characteristic.

SUMMARY OF THE INVENTION

A bicycle disc brake with a high gain mechanical brake actuator which can develop very strong and positive braking forces in response to either hand or foot applied actuation forces. The brake is self-aligning with the rotor so as not to distort the rotor during braking. The arrangement may be simply fitted to new bicycles or retrofitted on old bicycles with a minimum of difficulty.

DESCRIPTION OF THE DRAWINGS

FIG. 1 is a partial broken away side view of a bicycle showing pedal drive sprocket and rear wheel hub areas particularly illustrating the disc brake mechanism of this invention;

FIG. 2 is a partial broken away plan view of the same bicycle portion illustrated in FIG. 1 which shows another view of the disc brake mechanism;

DETAILED DESCRIPTION OF THE PREFERRED EMBODIMENT

Figure 3:
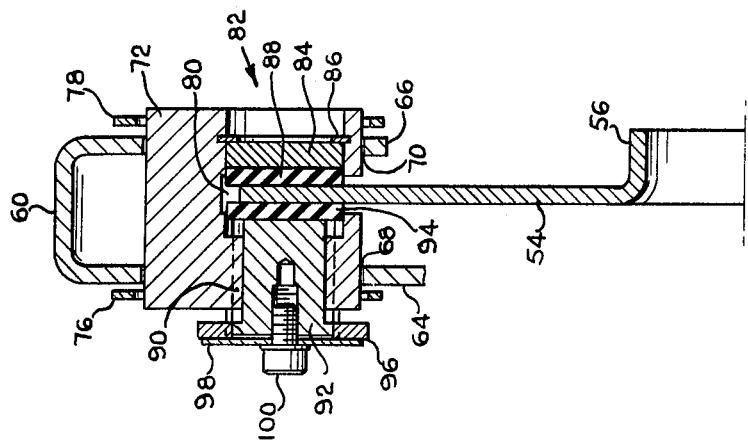
FIGS. 3 and 4 show a cross-sectional view of the disc brake taken along section lines A—A and B—B of FIG. 1.

Referring now to FIGS. 1 and 2, the bicycle frame parts are generally designated by numerals 10 and 12 for the bifurcated frame arms running from pedal bearing housing 14 to the rear wheel hub 16 in a conventional manner. Hub 16 is rotatably mounted on fixed axle 18 which extends through the terminal ends of the frame arms 10 and 12 and is affixed by attachment nuts 20. A crank arm mechanism 22, illustrated fragmentarily, is rotatably mounted in housing 14 and is adapted to be rotated by foot pedaling. A chain drive sprocket 24 is fixed to the crank arm mechanism and rotates therewith. Adjacent the hub 16 there is illustrated a multiple sprocket drive member 26 of the type utilized with derailleur multiple ratio chain drive systems. A mechanism, not shown, is utilized to selectively transfer a slack chain drive to the various diameter drive sprockets contained on the drive sprocket 26. It is also well known to have multiple sprockets attached to the crank arm mechanism for still greater available drive ratios.

Fixedly mounted on shaft 18 is a bearing cone or inner race member 28 which contains a circular track for ball bearings 30. A rotatable intermediate drive member 32 rides on ball bearings 30 and is secured to multi-ratio sprocket 26 to transmit driving rotation. Intermediate drive member 32 contains an axially extending portion 34 which projects into the hub and has a circular groove 36 formed on its outer surface in which the bearings 38 are entrained. Bearings 38 support one end of hub 16 and the other hub side would be supported by another set of roller bearings, not illustrated. Axially extending portion 34 of the intermediate drive member 32 has helical screw threads 40 formed thereon. A conical friction clutch member 42 has complementary helical screw threads formed on its inner diameter and threadedly engages the axially extending portion 34. The outer surface of clutch 42 is conically shaped and is adapted to mate with a complementary surface 44 formed on the inner diameter of hub 16. A disc abutment member 46 is fixedly secured to axle 18 and provides a fixed anchor for one finger of a circular spring retarder member 48, the other finger of which frictionally engages the outer surface of cone clutch member 42 to impose a resistive drag thereon. During the forward pedaling mode of the bicycle operation, cone clutch 42 traverses on its helical screw threads into solid frictional engagement with hub 16 to provide a driving connection. When positive driving torque is not being applied, the hub 16 will overrun the friction clutch 42 during coasting or may slip in a reverse direction during back walking of the bicycle. The operation of cone clutch 42 is more fully described in co-pending patent application MOC 70/33–B entitled "Bicycle Drive and Braking System" mailed to the Patent Office concurrently with this application.

A pair of flanges 50 and 52 are fixed to the external surface of hub 16 and are adapted to receive the conventional bicycle wheel spokes. Outboard of the flanges 52, a brake rotor member 54 having an inner rotor hub portion is fixedly secured to the hub 16. The brake rotor is of generally circular configuration as illustrated in FIG. 1.

A housing support bracket 60 extends generally radially with respect to the brake rotor 54 and has an end 62 which is affixed to the axle 18 outboard of the frame member 10 and fastened into position by nut 20. The radially outermost end of support bracket 60 is bent over into a U configuration forming two parallel spaced apart plates 64 and 66 each of which has a noncircular opening. In the illustrated case the openings 68 and 70 (refer to FIG. 3) are hexagonal for receiving a brake housing member 72 which has its external surface formed in a complementary shape to openings 68 and 70. A complementary noncircular configuration for openings 68 and 70 and external surface of housing 72 permit the housing to slide axially, best illustrated in FIG. 3, while the brake housing 72 is restrained against rotation about its own axis within the support bracket 60. As illustrated in FIG. 1, the support bracket 60 has a generally horizontal portion 74 which abuts against the frame member 10 to block the brake support bracket against rotation. The bracket could be clamped to the frame for additional support if desired. A pair of snap rings 76 and 78 are set in partial grooves running through the hexagonal peaks of the brake housing at 72 at each end to limit the degree of slidable movement of the brake housing within the support bracket 60 in a direction normal to the brake rotor 54.

The brake housing 72 has a slot 80 formed intermediate its ends for receiving the brake rotor 54. A through bore is formed through the brake housing in alignment with the slot and is designated generally by numeral 82. The rightmost portion of through bore 82, as illustrated in FIG. 3 is of generally cylindrical configuration and contains a metal reaction plate 84 which is held in position by snap ring 86 to form a reaction member for friction material pad 88. The leftmost portion of through bore 82 is threaded at 90 and receives a complementary threaded actuator member 92 which comprises the brake pressure plate member. A friction material pad 94 is contained on the end of brake actuator member 92. As the brake actuator member 92 is rotated, the threads 90 provide a high mechanical advantage and transmit the rotary motion to an axial force applied to the friction pad 94. As friction pad 94 advances against brake rotor 54, the brake housing 72 will slide within the openings 68 and 70 and thus bring friction pad 88 into engagement with the back side of the rotor in a clamping action. A rotary action applied to brake actuator 92 is resisted by the housing 72 due to the noncircular configurations of openings 68 and 70 and the complementary surface fitting of the housing 72.

Figure 4:
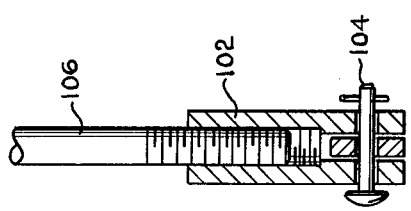

An actuating lever member 96 is connected to the externally extending end of the brake actuator member 92 and is retained in position by washer 98 and screw 100. The remote end of actuating lever, as illustrated in FIGS. 1 and 4, is connected to yoke 102 by pin 104 of the brake actuating rod 106. Brake actuating rod 106 extends along the frame member 10 up to the vicinity of the crank housing 14 where it is connected to arm 108 which extends from the external housing 110 of a one-way clutch mounted on the crank arm. During forward rotation of the crank arm 22, clutch 110 overruns leaving the brake inactive. However, on reverse rotation of the crank arm 22, one-way clutch 110 engages and transmits a braking motion through rod 106, lever 96 to the brake actuator member 92 to thus apply the brakes.

The brake thus obtained may be actuated by the foot pedal crank arm assembly as shown; however, due to the high mechanical advantage obtained through the helical threads 90, good strong braking forces may also be developed by a hand-manipulated actuator. It is also quite feasible to mount a hand actuated version of my disc brake on the front bicycle wheel as well as, or in lieu of the rear drive wheel mounted brake shown.

We claim:

1. A disc brake for a bicycle having a fixed frame supported shaft and a rotatable hub concentrically mounted about said shaft, said disc brake comprising:

a brake disc rotor member adapted to be secured to said rotatable hub at one side thereof for rotation therewith;

a brake support member adapted to be secured to a fixed portion of the bicycle having a noncircular opening therein generally normal to and in alignment with the radial outer edge of the rotor member;

a brake housing member disposed within the noncircular opening in said support member having an external surface shape complementary to and interfitting with said noncircular opening so that said housing is slidable with said support member in a direction normal to said rotor member but restrained against rotation about its own axis; said brake housing having a slot formed therein intermediate its ends for receiving the outer radial edge portion of said rotor member;

a screw actuator member threadedly secured within said brake housing member having one end extending externally of said housing member and another end in confronting braking relationship with said rotor member; and brake actuating means operative to apply a rotating torque to said one end of said screw actuator member to advance said member into frictional braking contact with said rotor member.

2. A disc brake for a bicycle as claimed in claim 1 wherein:
said brake support member is a radially disposed bracket arm member adapted to be secured at one end to the shaft of a bicycle and extending radially a distance greater than the rotor member.

3. A disc brake for a bicycle as claimed in claim 2 wherein:
said brake support member has spaced pair of plate portions formed at its radially outer end, each having a mating noncircular opening formed therein to support the brake housing member at spaced locations along its axial extent.

4. A disc brake for a bicycle as claimed in claim 3 wherein:
each of the pair of plate portions of said brake support member are arranged on opposite sides of the brake rotor member.

5. A disc brake for a bicycle as claimed in claim 1 wherein:
said brake housing member containing a fixed reaction member axially aligned with said screw actuator member on the opposed side of the rotor member.

6. A disc brake for a bicycle as claimed in claim 1 including:
retention means retaining said housing member within said noncircular opening while permitting limited axial movement thereof for alignment with said rotor member during braking.

7. A disc brake for a bicycle as claimed in claim 1 wherein:
said actuating means includes a rod and one-way overrunning clutch adapted to be connected to a bicycle foot pedaled crank assembly to impart a brake actuation motion on back rotation of the crank assembly.

* * * * *